US012565390B2

(12) United States Patent
Khambekar et al.

(10) Patent No.: US 12,565,390 B2
(45) Date of Patent: Mar. 3, 2026

(54) SYSTEM AND METHOD FOR FEEDING BULK MATERIAL INTO A PRESSURIZED ENVIRONMENT

(71) Applicant: Jenike & Johanson, Inc., Tyngsboro, MA (US)

(72) Inventors: Jayant V. Khambekar, Katy, TX (US); David A. Craig, Andover, MA (US); Thomas G. Troxel, Atascadero, CA (US); T. Anthony Royal, Nashua, NH (US)

(73) Assignee: Jenike & Johanson, Inc., Tyngsboro, MA (US)

( * ) Notice: Subject to any disclaimer, the term of this patent is extended or adjusted under 35 U.S.C. 154(b) by 497 days.

(21) Appl. No.: 18/097,182

(22) Filed: Jan. 13, 2023

(65) Prior Publication Data

US 2023/0234793 A1 Jul. 27, 2023

Related U.S. Application Data

(60) Provisional application No. 63/302,215, filed on Jan. 24, 2022.

(51) Int. Cl.
| | |
|---|---|
| *B65G 65/32* | (2006.01) |
| *B65D 88/72* | (2006.01) |
| (Continued) | |

(52) U.S. Cl.
CPC ............. *B65G 65/32* (2013.01); *B65D 88/72* (2013.01); *B65G 33/14* (2013.01); *B65G 33/26* (2013.01);
(Continued)

(58) Field of Classification Search
CPC ........ B65D 88/72; B65G 53/36; B65G 53/46; B65G 65/32; B65G 33/26; B65G 33/14; B65G 47/18; B65G 47/44; B65G 2201/04
See application file for complete search history.

(56) References Cited

U.S. PATENT DOCUMENTS

| | | |
|---|---|---|
| 2,848,144 A | 8/1958 | Haskell et al. |
| 2,975,919 A | 3/1961 | Pappas |
| | (Continued) | |

FOREIGN PATENT DOCUMENTS

| | | |
|---|---|---|
| CN | 106882604 A | 6/2017 |
| CN | 111674932 A | 9/2020 |
| | (Continued) | |

OTHER PUBLICATIONS

International Search Report from International Application No. PCT/US2023/010840, Date Mailed: Apr. 13, 2023.

*Primary Examiner* — Glenn F Myers
(74) *Attorney, Agent, or Firm* — Morse, Barnes-Brown & Pendleton, P.C.; Sean D. Detweiler, Esq.

(57) ABSTRACT

A system and method for feeding a high volume of low-bulk-density and pressure-sensitive feedstocks into a pressurized environment. The system includes a lock hopper filling system, one or more lock hoppers, a feed bin, and a feeder. The methods involve using such a system to feed bulk materials into a pressurized environment by feeding bulk material from a low pressure into the surge bin, filling the one or more lock hoppers from the surge bin, operating the lock hoppers, and discharging lock hoppers into feed bin, and discharging feed bin into the high-pressure zone using feeder.

61 Claims, 10 Drawing Sheets

(51) Int. Cl.

| | |
|---|---|
| *B65G 33/14* | (2006.01) |
| *B65G 33/26* | (2006.01) |
| *B65G 47/18* | (2006.01) |
| *B65G 47/44* | (2006.01) |

(52) U.S. Cl.

CPC ............. *B65G 47/18* (2013.01); *B65G 47/44* (2013.01); *B65G 2201/04* (2013.01)

(56) References Cited

U.S. PATENT DOCUMENTS

| | | | |
|---|---|---|---|
| 4,089,429 | A | 5/1978 | Stock et al. |
| 4,695,214 | A | 9/1987 | Scinta |
| 5,101,961 | A | 4/1992 | Bengtson et al. |
| 6,139,241 | A | 10/2000 | Craig et al. |
| 7,347,111 | B2 | 3/2008 | Brone et al. |
| 9,023,121 | B2 | 5/2015 | Tyll |
| 9,169,062 | B2 | 10/2015 | Reece et al. |
| 9,738,460 | B2 | 8/2017 | Powell et al. |
| 9,902,561 | B2 | 2/2018 | Tummala et al. |
| 10,150,925 | B2 | 12/2018 | Schmit et al. |
| 10,557,095 | B2 | 2/2020 | Xu et al. |
| 10,633,199 | B2 | 4/2020 | Schmit et al. |
| 10,717,594 | B2 | 7/2020 | Urakata et al. |
| 2011/0100274 | A1 | 5/2011 | Kuske et al. |
| 2015/0259152 | A1* | 9/2015 | Van Der Woning ... B65G 33/38 198/674 |
| 2016/0166998 | A1* | 6/2016 | Sacchi .................. B01F 35/881 414/21 |
| 2019/0202640 | A1 | 7/2019 | Chyou et al. |
| 2019/0219335 | A1 | 7/2019 | Tockert et al. |
| 2020/0270074 | A1* | 8/2020 | Kramer .................. B65G 53/24 |

FOREIGN PATENT DOCUMENTS

| | | |
|---|---|---|
| CN | 212475335 U | 2/2021 |
| CN | 113526039 A | 10/2021 |
| JP | 2005008165 A | 1/2005 |
| WO | 2023141070 A1 | 7/2023 |

* cited by examiner

SYSTEM AND METHOD FOR FEEDING BULK MATERIAL INTO A PRESSURIZED ENVIRONMENT

CROSS-REFERENCE TO RELATED APPLICATION(S)

This application claims priority to, and the benefit of, U.S. Provisional Application 63/302,215, filed Jan. 24, 2022, for all subject matter common to both applications. The disclosure of said provisional application is hereby incorporated by reference in its entirety.

FIELD OF THE INVENTION

The present invention relates to systems and methods for feeding a bulk material into a pressurized environment suitable for use with a high volume of bulk material that is sensitive to pressurization or packing. In particular, the present invention relates to systems and methods of feeding a high-volume of low-bulk-density and pressure-sensitive feedstocks into a pressurized environment.

BACKGROUND

The use of lock hoppers to feed bulk solids or bulk materials into pressurized environments is common. Typically, these lock hoppers have worked more or less successfully for applications that use relatively dry and free-flowing bulk materials that are not overly sensitive to compaction or pressurization. Examples include bulk materials such as coal and oil shale. Conventional lock hopper designs consist of converging section(s) that result in an outlet that is smaller than most if not all of the lock hopper geometry. While such design can work for applications involving coal and oil shale, these lock hopper designs are not suitable to handle bulk solids that are sensitive to pressurization or packing.

Also, generally, these lock hoppers have been used for applications that require relatively low-to-medium volumetric feed rate into the pressurized environment or vessel. As a result, for such applications, the use of two lock hoppers operating in parallel to feed one pressurized vessel has been typically sufficient. More than two lock hoppers to feed one pressurized vessel have seldom been used in typical coal or oil shale applications. In such two-lock-hoppers systems, as one lock hopper is utilized in the process of filling and pressurizing, the second lock hopper is utilized in the process of discharging bulk material into the pressurized environment, vessel, or reactor. Conventionally, the use of more than two lock hoppers is rarely utilized or discussed. In the cases where the use of more than two lock hoppers is considered, often the discussion has been mostly cursory, lacking consideration of how to physically arrange these multiple lock hoppers such that implementation of multiple-lock-hoppers feeding one pressurized vessel can be done in a practical manner, therefore failing to enable such multiple-lock-hopper configurations. This aspect becomes much more important as the number of lock hoppers feeding one pressurized vessel increases beyond two.

Also, in the prior art, discussion about how to effectively fill bulk material in a system where multiple lock hoppers are used, especially when the number of lock hoppers is large, is limited.

Recently, with the growth of the renewable energy/fuels/chemicals industry, interest in handling various low bulk density feedstocks is increasing. Examples include various types of biomass materials such as corn stover, agricultural waste, sawdust, miscanthus, switchgrass, as well as municipal solids waste (MSW). These materials have considerably lower bulk densities compared to materials like oil shale and coal. Furthermore, significant tonnage rates are required when feeding these materials to pressurized reactors to produce typical fuel yields. For example, typical commercial-scale operations require 25 to 50 tons/hr of feedstock to be fed to one reactor. The low bulk density, coupled with high tonnage rates, translates into the requirement of feeding very large volumes of these materials to a pressurized environment. For example, at 50 tons/hr feed rate, corn stover with a bulk density of 6 pcf will require 16,666 cubic feet of material to be fed to one reactor, every hour. This translates into volume larger than a box 25 ft long, 25 ft wide, and 25 ft tall, every hour.

The lock hopper concepts that have been considered before now do not apply well to such applications where volume requirements are very high, and continuous feed to the pressurized environment is required. There is no known configuration for optimally arranging multiple lock hoppers in a practical manner to feed one pressurized vessel. Furthermore, the use of many lock hoppers in parallel significantly complicates the arrangement to reliably fill bulk material into these lock hoppers. A very reliable system is required, which can effectively fill a large number of such lock hoppers, to ensure proper operation of the reactor vessel. In the prior art, discussion about how to continuously and reliably fill a large number of lock hoppers operating in parallel is rarely found.

Furthermore, the lock hopper concepts that have been considered before now do not apply well to many of these low bulk density feedstocks, which tend to be highly compressible and can pack considerably when pressurized. This results in significant operational issues with the conventional lock hoppers working with such low-density feedstocks. It is not uncommon for numerous operational issues to occur when discharging pressurized material from such conventional lock hoppers, thereby resulting in inoperable or inefficient implementations.

SUMMARY

There is a need for a system and method for feeding large volumes of low-bulk-density and pressure-sensitive feedstocks into a pressurized environment. The present invention is directed toward further solutions to address this need, in addition to having other desirable characteristics. Specifically, the use of multiple lock-hoppers for pressurization and the required configuration and implementation details to reliably and effectively fill bulk material into an arrangement of multiple lock hoppers where the multiple-lock-hoppers are feeding one pressurized vessel in a practical manner are provided herein.

In addition, because of the use of multiple lock hoppers, flexibility is achieved with respect to the pressurization cycle time.

Furthermore, the inventive system enables scale-up of process, where initially the design can include just one lock hopper, and then the system can be scaled up very easily, because of the use of an "array" of lock hoppers.

In accordance with example embodiments of the present invention, a lock hopper filling system is provided. The lock hopper filling system includes a surge bin for receiving bulk material, a material propagation mechanism disposed in the surge bin, one or more converging-diverging hoppers in fluid communication with the surge bin, and one or more screw feeders. Each screw feeder is disposed at an outlet of each converging-diverging hopper and configured to move bulk material from the hopper into an inlet valve of a lock hopper.

In accordance with aspects of the invention, the surge bin includes a top end having an opening for receiving the bulk material, a bottom end having at one or more circumferential opening for discharging/emitting the bulk material, each circumferential opening of the one or more circumferential opening being in fluid communication with one of the one or more converging-diverging hoppers, and at least one diverging wall extending from the top end to the bottom end. In some such aspects, the material propagation mechanism comprises an agitator configured to push the bulk material from a center of the surge bin toward the one or more circumferential openings. In further aspects, the agitator comprises a bar vertically extending from the bottom end of the surge bin toward the top end of the surge bin; a first set of horizontal arms extending from the bar in proximity to the bottom end of the surge bin, the first set of horizontal arms comprising two or more horizontal arms symmetrically placed about the bar, wherein each arm is configured to push the bulk material from the center of the surge bin toward the one or more circumferential openings; and a second set of horizontal arms extending from the bar in proximity to a mid-height of the surge bin having two or more horizontal arms symmetrically placed about the bar. In still further aspects, each arm has two or more flat plates that are progressively recessing from the center of the surge bin toward its circumference, in a direction of rotation of the agitator. In additional aspects, the one or more circumferential opening comprises a circumferential array of rectangular or rounded (such as obround or the like) outlet openings, evenly distributed.

In accordance with aspects of the present invention, the surge bin comprises a top end having an opening for receiving a bulk material, a bottom end having an outlet for dispensing the bulk material in fluid communication with one of the one or more converging-diverging hoppers, and a sloping surface extending from the top end to the bottom end. The sloping surface acts as a chute where an angle of the sloping surface is steeper than a critical chute angle of the bulk material, which causes the bulk material to flow to the material propagation mechanism disposed in the surge bin due to gravitational force on the bulk material. In some such aspects, the material propagation mechanism comprises a distributor screw comprising right-handed flights on a first half of its length and left-handed flights on a second half of its length, such that the distributor screw distributes the bulk material from a center toward both a first end and a second end opposite the first end of the propagation mechanism. In other such aspects, the surge bin has a rectangular outlet, which has a linear array of several outlet openings evenly distributed, each outlet opening being in fluid communication with one of the one or more converging-diverging hoppers.

In accordance with aspects of the present invention, each of the one or more converging-diverging hoppers comprises a set of converging side walls disposed opposite each other and a set of diverging end walls disposed opposite each other at ends of the converging side walls. The sets of converging side walls and diverging end walls form an inlet at a top end of the converging-diverging hopper configured for receiving bulk material and an outlet at a bottom end of the converging-diverging hopper configured for dispensing bulk material and the side walls form angles relative to vertical that are smaller than a critical mass-flow angle of the bulk material.

In accordance with aspects of the present invention, the one or more screw feeders are configured to achieve increasing capacity in a direction of feed. In some such aspects, the one or more screw feeders comprise a screw configuration having a combination of tapering shaft and increasing pitch between screw flights, to allow for increase in a pitch volume from a start of the screw to at least a length Lf of a feed section of the screw or to an end of the screw. In other such aspects, the one or more screw feeders comprise shaft comprising a plurality of coaxial and contiguous cylindrical sections having progressively decreasing diameters and extending along a length L in a feed direction and a screw blade formed in a helix coaxial with the shaft and having surfaces radially extending from the surface of each section of the shaft to an edge of constant diameter D over the length L. The volume capacity of each section being proportional to a difference between $D^2$ and a square of the cylindrical section diameter, and wherein differences in volume capacity between each pair of contiguous sections are equal at least over a length Lf of a feed section of the screw or over length L.

In accordance with aspects of the present invention, the system further includes a conveyor belt configured to convey the bulk material to the surge bin.

In accordance with example embodiments of the present invention, a lock hopper is provided. The lock hopper includes a housing having a top inlet, a bottom outlet, and internal volume defined by diverging walls that are diverging toward the bottom outlet; a gas pressure sealing valve at the top inlet; a gas pressure sealing valve at the bottom outlet; and at least three gas injection nozzles arranged to be equidistant from each other and configured to inject or withdraw gas into the lock hopper in a tangential manner.

In accordance with aspects of the present invention, by injecting gas in a tangential manner, the lock hopper minimizes a gas pressure gradient during pressurization, which minimizes consolidation and/or packing and arching potential of bulk materials in the lock hopper.

In accordance with example embodiments of the present invention, a system for feeding bulk material into a pressurized environment is provided. The system includes a lock hopper filling system comprising a surge bin, one or more lock hoppers, a feed bin, and a feeder. The surge bin is for receiving bulk materials and comprises a material propagation mechanism disposed in the surge bin, one or more converging-diverging hoppers in fluid communication with the surge bin, and one or more screw feeders. Each screw feeder disposed at an outlet of each converging-diverging hopper and configured to move material from the hopper into an inlet valve of a lock hopper. The one or more lock hoppers are each in fluid communication with one of the one or more screw feeders. Each lock hopper comprises a housing having a top inlet, a bottom outlet, and internal volume defined by diverging walls that are diverging toward the bottom outlet; a gas pressure sealing valve at the top inlet; a gas pressure sealing valve at the bottom outlet; and at least three gas injection nozzles arranged to be equidistant from each other and configured to inject or withdraw gas into the lock hopper in a tangential manner. The feed bin is in fluid communication with the bottom outlet of each of the one or more lock hoppers. The feed bin has diverging walls. The feeder comprises one or more screws configured to continuously discharge bulk material from the feed bin into an inlet opening of the pressurized environment.

In accordance with aspects of the present invention, the surge bin comprises a top end having an opening for receiving a bulk material, a bottom end having at one or more circumferential opening for discharging/emitting a bulk material, each circumferential opening of the one or more circumferential opening being in fluid communication with one of the one or more converging-diverging hoppers, and at least one diverging wall extending from the top end to the bottom end.

In accordance with aspects of the present invention, the material propagation mechanism comprises an agitator configured to push bulk material from a center of surge bin toward the one or more circumferential openings. In further such aspects, the agitator comprises a bar vertically extending from a bottom end of the surge bin toward a top end of the surge bin; a first set of horizontal arms extending from the bar in proximity to the bottom end of the surge bin, the first set of horizontal arms comprising two or more horizontal arms symmetrically placed about the bar, wherein each arm is configured to push bulk material from the center of surge bin toward the one or more circumferential openings; and a second set of horizontal arms extending from the bar in proximity to a mid-height of the surge bin having two or more horizontal arms symmetrically placed about the bar. In still further such aspects, each arm has two or more flat plates that are progressively recessing from a center of the surge bin toward its circumference, in a direction of rotation of the agitator.

In accordance with aspects of the present invention, the one or more circumferential opening comprises a circumferential array of rectangular or rounded (such as obround, or the like) outlet openings, evenly distributed.

In accordance with aspects of the present invention, the surge bin comprises a top end having an opening for receiving a bulk material, a bottom end having an outlet for dispensing a bulk material in fluid communication with one of the one or more converging-diverging hoppers, and a sloping surface extending from the top end to the bottom end. The sloping surface acts as a chute where an angle of the sloping surface is steeper than a critical chute angle of the bulk material, and which causes the bulk material to flow to the material propagation mechanism disposed in the surge bin due to gravitational force on the bulk material. In some such aspects, the material propagation mechanism comprises a distributor screw comprising right-handed flights on a first half of its length and left-handed flights on a second half of its length, such that the distributor screw distributes the bulk material from a center toward both a first end and a second end opposite the first end of the propagation mechanism. In other such aspects, the surge bin has a rectangular outlet, which has a linear array of several outlet openings evenly distributed, each outlet opening being in fluid communication with one of the one or more converging-diverging hoppers.

In accordance with aspects of the present invention, each of the one or more converging-diverging hoppers comprises a set of converging side walls disposed opposite each other and a set of diverging end walls disposed opposite each other at ends of the converging side walls. The sets of converging side walls and diverging end walls form an inlet at a top end of the converging-diverging hopper configured for receiving bulk material and an outlet at a bottom end of the converging-diverging hopper configured for dispensing bulk material and the side walls form angles relative to vertical that are smaller than a critical mass-flow angle of the bulk material.

In accordance with aspects of the present invention, the one or more screw feeders are configured to achieve increasing capacity in a direction of feed. In some such aspects, the one or more screw feeders comprise a screw configuration having a combination of tapering shaft and increasing pitch between screw flights, to allow for increase in a pitch volume, from a start of the screw to at least an end of a feed section of the screw or to an end of the screw. In other such aspects, the screw feeder comprises a shaft comprising a plurality of coaxial and contiguous cylindrical sections having progressively decreasing diameters and extending along a length L in a feed direction and a screw blade formed in a helix coaxial shape with the shaft and having surfaces radially extending from the surface of each section of the shaft to an edge of constant diameter D over the length L. The volume capacity of each section being proportional to a difference between $D^2$ and a square of the cylindrical section diameter, and differences in volume capacity between each pair of contiguous sections being equal at least over a length Lf of the feed section or over the length L.

In accordance with aspects of the present invention, the system further includes a conveyor belt for conveying the bulk material to the surge bin.

In accordance with aspects of the present invention, the feeder is configured to achieve increasing capacity in a direction of feed.

In accordance with aspects of the present invention, each of the one or more screws of the feeder comprises a screw configuration having a combination of tapering shaft and increasing pitch between screw flights, to allow for increase in a pitch volume, from a start of the screw to at least a length to an end of the screw.

In accordance with aspects of the present invention, each of the one or more screws of the feeder comprises a shaft comprising a plurality of coaxial and contiguous cylindrical sections having progressively decreasing diameters and extending along a length L in a feed direction and a screw blade formed in a helix coaxial with the shaft and having surfaces radially extending from the surface of each section of the shaft to an edge of constant diameter D over the length L. The volume capacity of each section being proportional to a difference between $D^2$ and a square of the cylindrical section diameter and differences in volume capacity between each pair of contiguous sections being equal over the length L.

In accordance with aspects of the present invention, the system further includes a conveyor disposed between the feeder and the inlet opening of the pressurized environment, wherein the conveyor is oriented perpendicular to an outlet of the feeder and discharges bulk material into the inlet opening of the pressurized environment. In some such aspects, the conveyor comprises a screw conveyor.

In accordance with example embodiments of the present invention, a method for transferring bulk materials from a low-pressure zone to a high-pressure zone is provided. The method involves providing a system for feeding bulk material into a pressurized environment as set forth above; providing bulk material from a low pressure to the surge bin, continuously or intermittently, such that a material level in the surge bin is maintained above a certain minimum level; actuating the material propagation mechanism continuously or intermittently to fill the converging-diverging hoppers. The method further includes each lock hopper operating the screw feeder configured to move material from the converging-diverging hopper into an inlet valve of a lock hopper, when the inlet valve of the lock hopper in communication with a converging-diverging hopper opens to fill the lock hopper with a desired amount of bulk material; closing the inlet valve of the lock hopper upon filling a desired quantity of material; injecting a gas into the lock hopper using the at least three tangential injection nozzles until desired high pressure is reached in the lock hopper; opening the outlet valve of the lock hopper; discharging the material from the lock hopper into the feed bin; closing the outlet valve; withdrawing gas from the lock hopper using the injection nozzles until a desired low-pressure is reached in the lock hopper; and opening the inlet valve. The bulk material is then continuously discharged from the feed bin, which is at the high pressure, into the high pressure zone using the feeder.

In accordance with aspects of the present invention, recirculation of gas is maintained between the feed bin and the lock hoppers. In accordance with aspects of the present invention, recirculation of gas is maintained between the various lock hoppers.

In accordance with aspects of the present invention, the surge bin comprises a top end having an opening for receiving a bulk material; a bottom end having one or more circumferential opening for discharging/emitting a bulk material, each circumferential opening in fluid communication with one of the one or more converging-diverging hoppers; and at least one diverging wall extending from the top end to the bottom end.

In accordance with aspects of the present invention, the material propagation mechanism comprises an agitator configured to push bulk material from a center of surge bin toward the one or more circumferential openings. In some such aspects, the agitator comprises a bar vertically extending from the bottom end of the surge bin toward the top end of the surge bin; a first set of horizontal arms extending from the bar in proximity to the bottom end of the surge bin, the first set of horizontal arms comprising two or more horizontal arms symmetrically placed about the bar, wherein each arm is configured to push bulk material from the center of surge bin toward the one or more circumferential openings; and a second set of horizontal arms extending from the bar in proximity to a mid-height of the surge bin having two or more horizontal arms symmetrically placed about the bar. In further such aspects, each arm has two or more flat plates that are progressively recessing from the center of the surge bin toward its circumference, in a direction of rotation of the agitator. In other such aspects, the one or more circumferential opening comprises a circumferential array of rectangular or rounded (such as obround or the like) outlet openings, evenly distributed.

In accordance with aspects of the present invention, the surge bin comprises a top end having an opening for receiving a bulk material, a bottom end having an outlet for dispensing a bulk material in fluid communication with one of the one or more converging-diverging hoppers, and a sloping surface extending from the top end to the bottom end. The sloping surface acts as a chute where an angle of the sloping surface is steeper than a critical chute angle of the bulk material, and which causes the bulk material to flow to the material propagation mechanism disposed in the surge bin due to gravitational force on the bulk material. In some such aspects, the material propagation mechanism comprises a distributor screw comprising right-handed flights on a first half of its length and left-handed flights on a second half of its length, such that the distributor screw distributes the bulk material from a center toward both a first end and a second end opposite the first end of the propagation mechanism. In other such aspects the surge bin has a rectangular outlet, which has a linear array of several outlet openings evenly distributed, each outlet opening being in fluid communication with one of the one or more converging-diverging hoppers.

In accordance with aspects of the present invention, each of the one or more converging-diverging hoppers comprises a set of converging side walls disposed opposite each other and a set of diverging end walls disposed opposite each other at the ends of the converging side walls. The sets of converging side walls and diverging end walls form an inlet at a top end of the converging-diverging hopper configured for receiving bulk material and an outlet at a bottom end of the converging-diverging hopper configured for dispensing bulk material and the side walls form angles relative to vertical that are smaller than a critical mass-flow angle of the bulk material.

In accordance with aspects of the present invention, the screw feeder is configured to achieve increasing capacity in a direction of feed. In some such aspects, the screw feeder comprises a screw configuration having a combination of tapering shaft and increasing pitch between screw flights, to allow for increase in a pitch volume, from a start of the screw to at least a length Lf of a feed section of the screw or to an end of the screw. In other such aspects, the screw feeder comprises a shaft comprising a plurality of coaxial and contiguous cylindrical sections having progressively decreasing diameters and extending along a length L in a feed direction and a screw blade formed in a helix coaxial with the shaft and having surfaces radially extending from the surface of each section of the shaft to an edge of constant diameter D over the length L. The volume capacity of each section being proportional to a difference between $D^2$ and a square of the cylindrical section diameter, and differences in volume capacity between each pair of contiguous sections being equal at least over a length Lf of the feed section of the screw or over the length L.

In accordance with aspects of the present invention, the method further comprises the system further including a conveyor belt for conveying the bulk material to the surge bin.

In accordance with aspects of the present invention, the feeder is configured to achieve increasing capacity in a direction of feed.

In accordance with aspects of the present invention, each of one or more screw feeders comprises a screw configuration having a combination of tapering shaft and increasing pitch between screw flights, to allow for increase in a pitch volume, from a start of the screw to at least a length Lf of a feed section of the Screw or to an end of the screw.

In accordance with aspects of the present invention, each of the one or more screws of the feeder comprises a shaft comprising a plurality of coaxial and contiguous cylindrical sections having progressively decreasing diameters and extending along a length L in a feed direction and a screw blade formed in a helix coaxial with the shaft and having surfaces radially extending from a surface of each section of the shaft to an edge of constant diameter D over the length L. The volume capacity of each section being proportional to a difference between $D^2$ and a square of the cylindrical section diameter, and wherein differences in volume capacity between each pair of contiguous sections being equal at least over a length Lf of a feed section of the screw or over length L.

In accordance with aspects of the present invention, the method further comprises the system further including a conveyor disposed between the feeder and the inlet opening of a pressurized zone, wherein conveyor is oriented perpendicular to an outlet of the feeder and discharges bulk material into the inlet opening of the pressurized zone. In some such embodiments, the conveyor comprises a screw conveyor.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
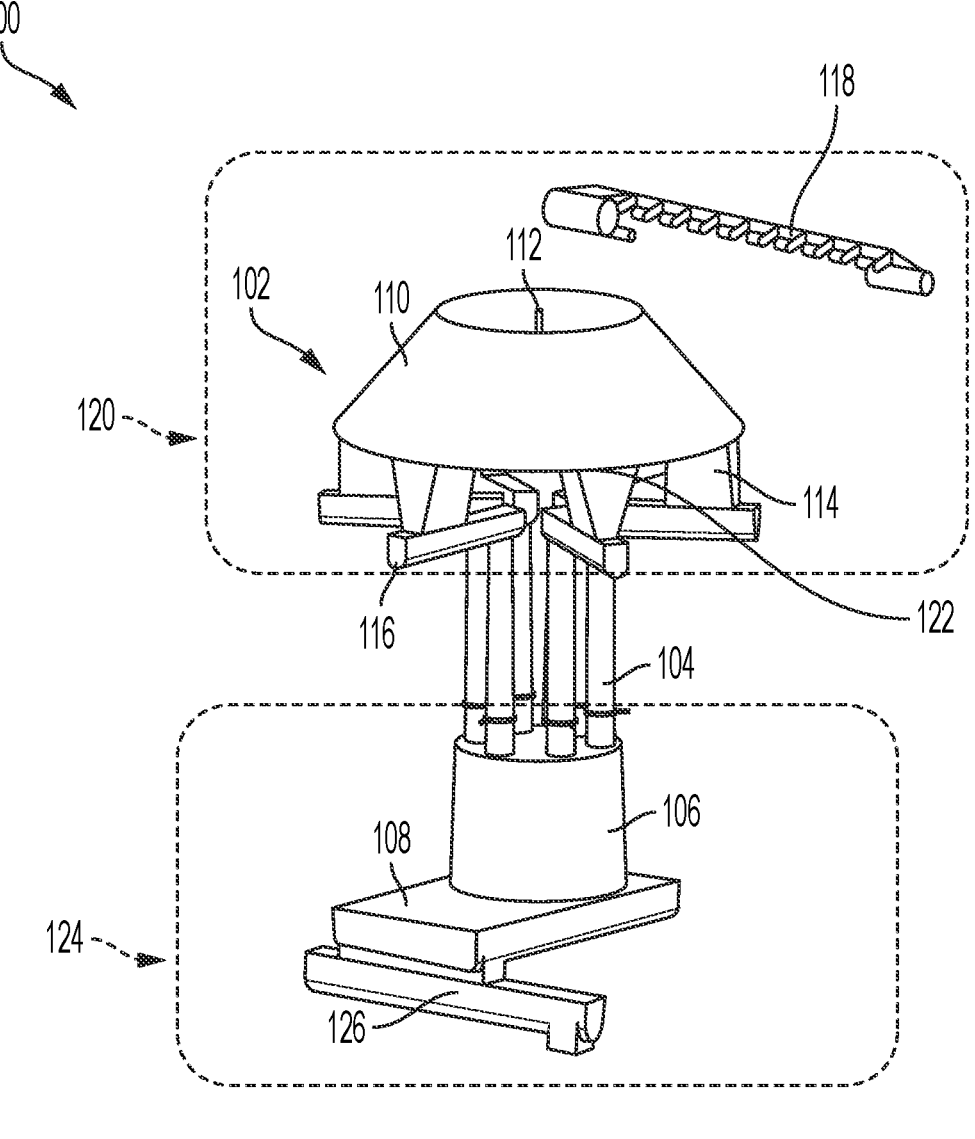
FIG. 1 depicts an example system for feeding bulk material into a pressurized environment in accordance with an embodiment of the present invention.

An illustrative embodiment of the present invention relates to systems and methods of feeding a high volume of low-bulk-density and pressure-sensitive feedstocks into a pressurized environment. The system includes a lock hopper filling system, one or more lock hoppers, a feed bin, and a feeder. The methods involve using such a system to feed bulk materials into a pressurized environment by feeding bulk material from a low pressure into a surge bin of the lock hopper filling system, filling the one or more lock hoppers from the surge bin; operating the lock hoppers, and discharging the lock hoppers into the feed bin, and discharging the feed bin into the high-pressure zone using the feeder.

FIGS. 1 through 10, wherein like parts are designated by like reference numerals throughout, illustrate an example embodiment or embodiments of systems and methods of feeding a high volume of low-bulk-density and pressure-sensitive feedstocks into a pressurized environment, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 shows an example embodiment of a system 100 to feed bulk material into a pressurized environment. System 100 includes a lock hopper filling system 102, one or more lock hoppers 104; a feed bin 106; and a feeder 108.

The lock hopper filling system 102 includes a surge bin 110 for receiving bulk material, a material propagation mechanism 112 disposed in the surge bin 110, one or more converging-diverging hoppers 114 in fluid communication with the surge bin 110; and one or more screw feeders 116, each screw feeder 116 disposed at an outlet of each converging-diverging hopper 114 and configured to move material from the hopper 114 into an inlet valve of a lock hopper 104.

In the example embodiment of FIG. 1, a conventional belt conveyor 118 conveys the bulk material/feedstock to the system 100. This belt conveyor 118 is in a low-pressure zone 120. The belt conveyor 118 can be replaced with other types of conveyors such as a conventional screw conveyor or a conventional drag-chain conveyor, as would be appreciated by those of skill in the art. This conveyor 118 discharges bulk material into the surge bin 110 as shown. This specially designed surge bin 110 has a specially designed material propagation mechanism 112, in this case, an agitator. The surge bin 110 has a circumferential array of openings 122 at its bottom. Each opening 122 connects to a specially designed converging-diverging hopper 114. Each converging-diverging hopper has a specially designed screw feeder 116 underneath, which discharges material into a specially designed lock hopper 104. All the lock hoppers 104 discharge into a specially designed feed bin 106, which is in a high-pressure zone 124. The feed bin 106 has a specially designed mass-flow screw feeder 108 at its bottom, which consists of one or more screws/augers. The screw feeder 108 discharges into one common conventional conveyor 126, such as a screw conveyor, which runs perpendicular to the mass-flow screw feeder 108. The mass-flow screw feeder 108 and conveyor 126 discharges material into the inlet opening of the pressurized vessel/reactor/environment.

Figure 2:
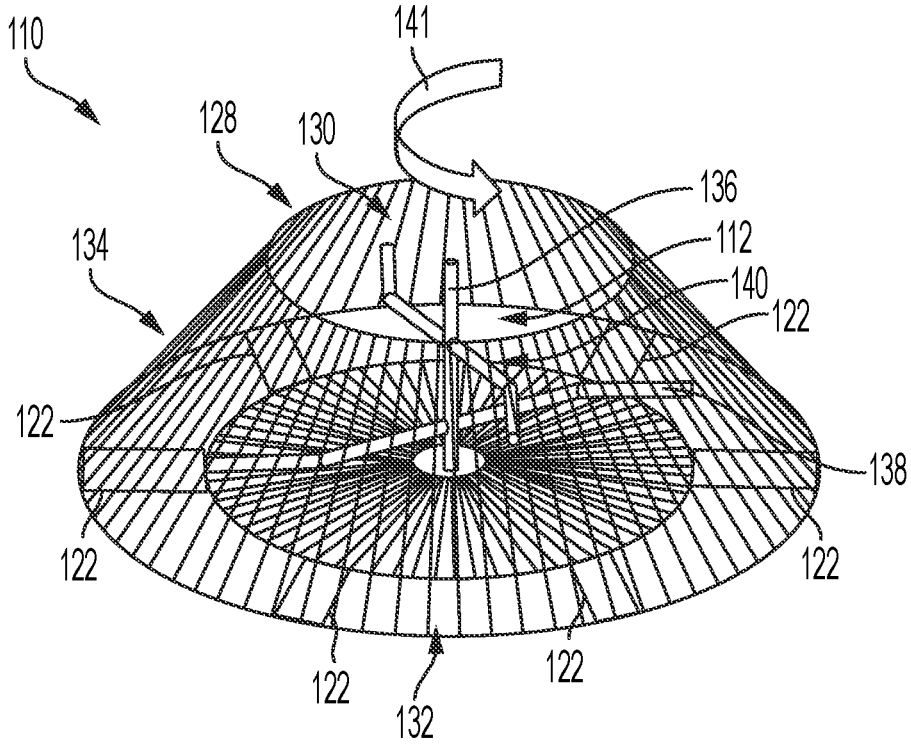
FIG. 2 depicts as example surge bin for use with the system of FIG. 1 in accordance with an embodiment of the present invention.

An example of a surge bin 110 used in the system 100 of FIG. 1 is shown in FIG. 2. Here the surge bin 110 has a top end 128 having an opening 130 for receiving a bulk material, a bottom end 132 having one or more circumferential openings 122 for discharging/emitting a bulk material, and at least one diverging wall 134 extending from the top end 128 to the bottom end 132.

This surge bin 110 is specially designed to have diverging walls 134, to reduce the packing of pressure-sensitive bulk materials. The surge bin 110 also has a specially designed material propagation mechanism 112 in it. In this example embodiment, the material propagation mechanism 112 is an agitator. This agitator has a central vertical bar 136 and two sets of horizontal arms 138, 140. The bar 136 extends vertically from the bottom end 132 to the top end 128 of the surge bin 110. It has two or more sets of horizontal arms 138, 140 symmetrically placed about the bar 136. The first set of horizontal arms 138 is in proximity to the bottom end 132 of the surge bin 110, to facilitate material movement towards the circumference of the surge bin 110. The second set of horizontal arms 140 is placed near the mid-height of the surge bin 110. The surge bin 110 has a circumferential array of rounded (such as obround or the like) or rectangular outlet openings 122, evenly distributed. Each set of arms 138, 140 has two or more flat plates, specially designed to push material, while reducing compaction. This is achieved by using an arm design that is progressively recessing from the center of the surge bin 110 towards its circumference, in the direction of rotation 141 of the agitator.

Figure 3:
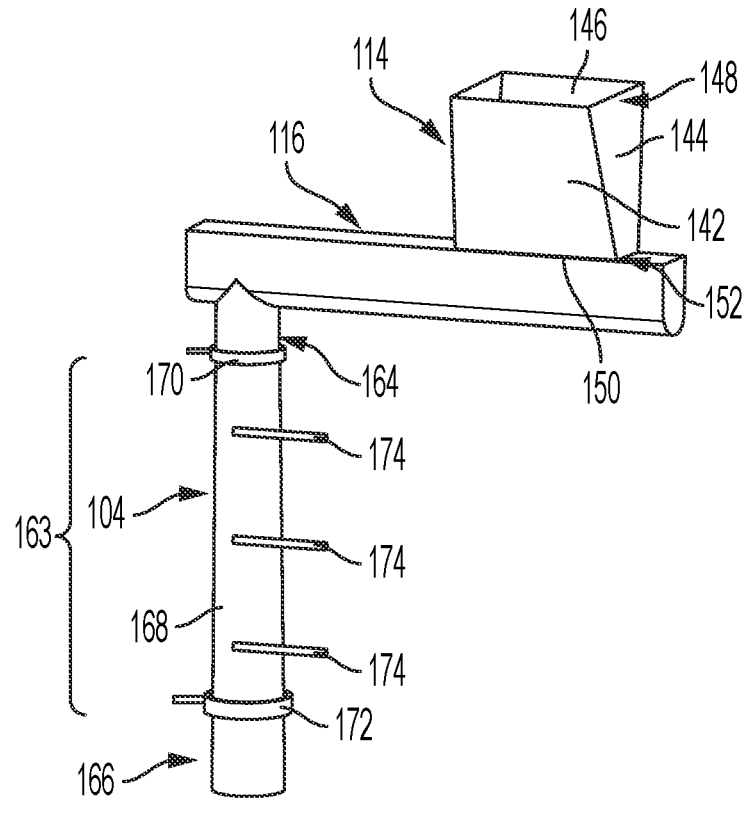
FIG. 3 depicts an example converging-diverging hopper, screw feeder, and lock hopper in accordance with embodiments of the present invention.

Below each outlet opening 122 of the surge bin 110, there is a converging-diverging hopper 114. FIG. 3 shows a specially designed converging-diverging hopper geometry that reduces consolidation and packing of pressure-sensitive bulk material. This hopper 114 has converging side walls 142 disposed opposite each other and diverging end walls 144 disposed opposite each other at the ends of the side walls 142. The sets of converging side walls 142 and diverging end walls form an inlet 146 at a top end 148 of the converging-diverging hopper 114 and an outlet 150 at the bottom end 152 of the converging-diverging hopper 114. The side walls 142 form angles to the vertical that are smaller than the critical mass-flow angle of the bulk material. That is, when a bulk material is being withdrawn from a hopper 114, the converging walls 142 of the hopper must be sufficiently smooth and steep to allow material flow along the hopper walls 142. Otherwise, an active flow channel will form above the hopper outlet 150, with stagnant material between the flow channel and the hopper walls 142. If the bulk material has sufficient cohesive strength, this stagnant material will not slide into the flow channel and will form a stable rathole. Such rathole will lead to stoppage of flow once bulk material in the flow channel empties out. This scenario (where some material is in motion during flow and some material is stagnant), termed as funnel flow, can be prevented by achieving mass flow discharge in the hopper. In mass flow, all of the bulk material in the hopper 114 is in motion whenever any material is withdrawn from the hopper 114. Material from the center as well as the periphery moves toward the hopper outlet 150. Mass flow hoppers 114 provide a first-in-first-out flow sequence and eliminate stagnant material. Achieving mass flow requires that the converging hopper walls 142 are smooth and steep enough, and the hopper outlet 150 is large enough to overcome arching. The required steepness or angle of converging hopper walls 142 to achieve mass flow is dependent on the bulk material itself, the internal surface/finish of the converging hopper walls 142, as well as the operating conditions such as moisture content and major consolidation pressure. This maximum angle from vertical required to achieve mass flow for a given bulk material, for converging hopper walls 142 with a given internal surface/finish, under the given operating conditions is called the critical mass flow angle. Those skilled in the art are able to determine the critical mass flow angle for the specific handling conditions. This converging-diverging hopper 114 makes use of a special design, which is similar to U.S. Pat. No. 6,139,241, awarded to Jenike & Johanson, Inc. U.S. Pat. No. 6,139,241 refers to the use of at least an upper element and a lower element, whereas this converging-diverging hopper design has only the upper element (as described in U.S. Pat. No. 6,139,241).

The converging-diverging hopper 114 has a mass-flow screw feeder 116 underneath. This mass-flow screw feeder 116 is specially designed to achieve increased capacity in the direction of feed. Such a mass-flow screw feeder 116 can be realized by designing the screw 154 following any of the embodiments of U.S. Pat. No. 5,101,961, awarded to Jenike & Johanson, Inc, an example of which is shown in Example A of FIG. 4. Here the shaft 156 comprises a plurality of coaxial and contiguous cylindrical sections having progressively decreasing diameters at least along length Lf in the feed direction, which represents the length of the feed section of the screw 154 and extending along a length L and a screw blade 158 formed in a helix coaxial with the shaft and having surfaces radially extending from the surface of each section of the shaft to an edge of constant diameter D over the length L, a volume capacity of each section being proportional to a difference between $D^2$ and a square of the cylindrical section diameter, and wherein differences in volume capacity between each pair of contiguous sections are equal at least over length Lf.

Figure 4:
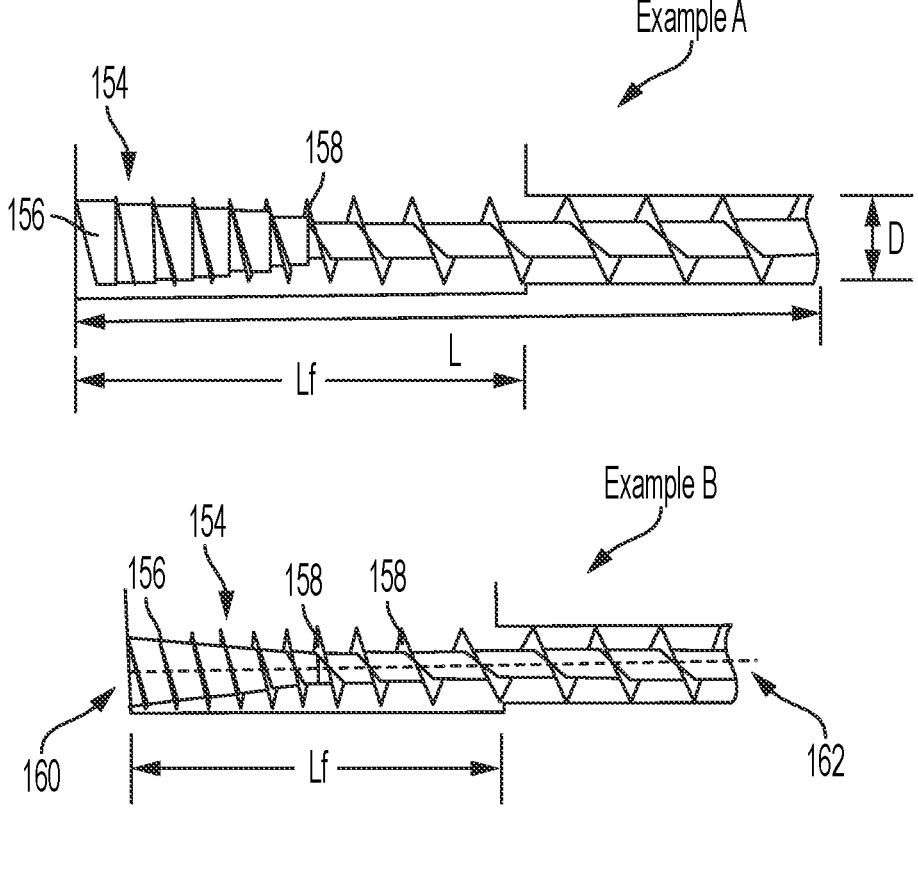
FIG. 4 depicts example screws for use in a screw feeder and/or mass-flow screw feeder and/or feeder in accordance with embodiments of the present invention.
Figure 5:
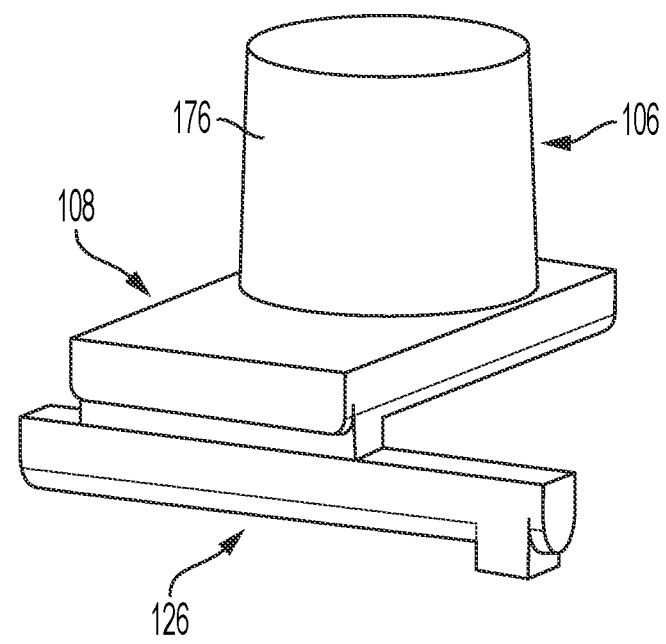
FIG. 5 depicts a feed bin and feeder for use with the system of FIG. 1 in accordance with embodiments of the present invention.

An alternate configuration can also be achieved using a screw feeder design that has a combination of tapering shaft 156 and increasing pitch between screw flights 158, to allow for an increase in the pitch volume, from the start 160 of the screw 154 at least for the length Lf of the feed section or up to the end 162 of the screw 154, as shown Example B in FIG. 4.

Referring back to FIG. 3, each of the one or more screw feeders 116 is in fluid communication with and feeds into a lock hopper 104. Each lock hopper 104 comprises a housing 163 having a top inlet 164, a bottom outlet 166, and internal volume defined by diverging walls 168 that are diverging toward the bottom outlet 166. A gas pressure sealing valve 170 is provided at the top inlet 164. Another gas pressure sealing valve 172 is provided at the bottom outlet 166. The lock hopper 104 also includes at least three gas injection nozzles 174 arranged to be equidistant from each other and configured to inject gas into the lock hopper 104 in a tangential manner. These nozzles 174 can also be used to withdraw gas from the lock hopper 104 when needed to achieve a desired pressure in the lock hopper 104.

This lock hopper 104 has diverging walls 168 that reduce consolidation and packing of bulk material, especially during discharge. The three gas injection nozzles 174 form an integral part of this lock hopper design. These nozzles 174 are specially arranged such that they are equally spaced from each other, as shown in FIG. 3. Furthermore, these nozzles 174 are specially designed to inject gas into the lock-hopper in a tangential manner. By injecting gas in a tangential manner, this lock hopper design minimizes the gas pressure gradient during pressurization, which minimizes the consolidation/packing and arching potential of bulk material. Alternately, the nozzles 174 can be used to withdraw gas from the lock hopper 104 when needed to achieve a desired pressure in the lock hopper 104.

As shown in FIG. 1, The belt conveyor 118, surge bin 110, converging-diverging hoppers 114, and mass-flow screw feeders 116 below the converging-diverging hoppers 114 are in a low-pressure zone 120. The lock hoppers 104 switch between low pressure 120 and high pressure 124, depending on their state of pressurization.

Once bulk material is discharged from the outlet 166 of a lock hopper 104, it falls into a specially designed feed bin 106, which is in the high-pressure zone 124. An example of a feed bin 106 used in the system 100 of FIG. 1 can be seen in FIG. 5. This feed bin 106 is in fluid communication with the bottom outlet 166 of each lock hopper 104 and has diverging walls 176 to reduce the packing of pressure-sensitive bulk materials during discharge. Below the feed bin 106, there is a feeder 108 which consists of one or more, specially designed mass-flow screws 154. These screws are specially designed, as described above in regard to FIG. 4, to achieve increased capacity in the direction of feed. As such, this feeder 108 is referred to as a mass-flow screw feeder. If the magnitude of pressure in the high-pressure zone 124 is high enough, the geometry of the feeder 108 can be configured to use as much curved enclosure geometry as practically possible in place of the flat sections of the feeder 108.

The mass-flow screw feeder 108 discharges material into a conventional conveyor 126, such as a screw conveyor, which is oriented perpendicular to the mass-flow screw feeder 108. Such perpendicular orientation of the conveyor facilitates withdrawal of material discharged by all the mass-flow screws 154. The screw conveyor 126 discharges material into the inlet opening of a pressurized vessel or reactor. If the magnitude of pressure in the high-pressure zone 124 is high enough, the geometry of the conveyor 126 can be configured to use as much curved enclosure geometry as practically possible in place of the flat sections of the conveyor 126.

Figure 6:
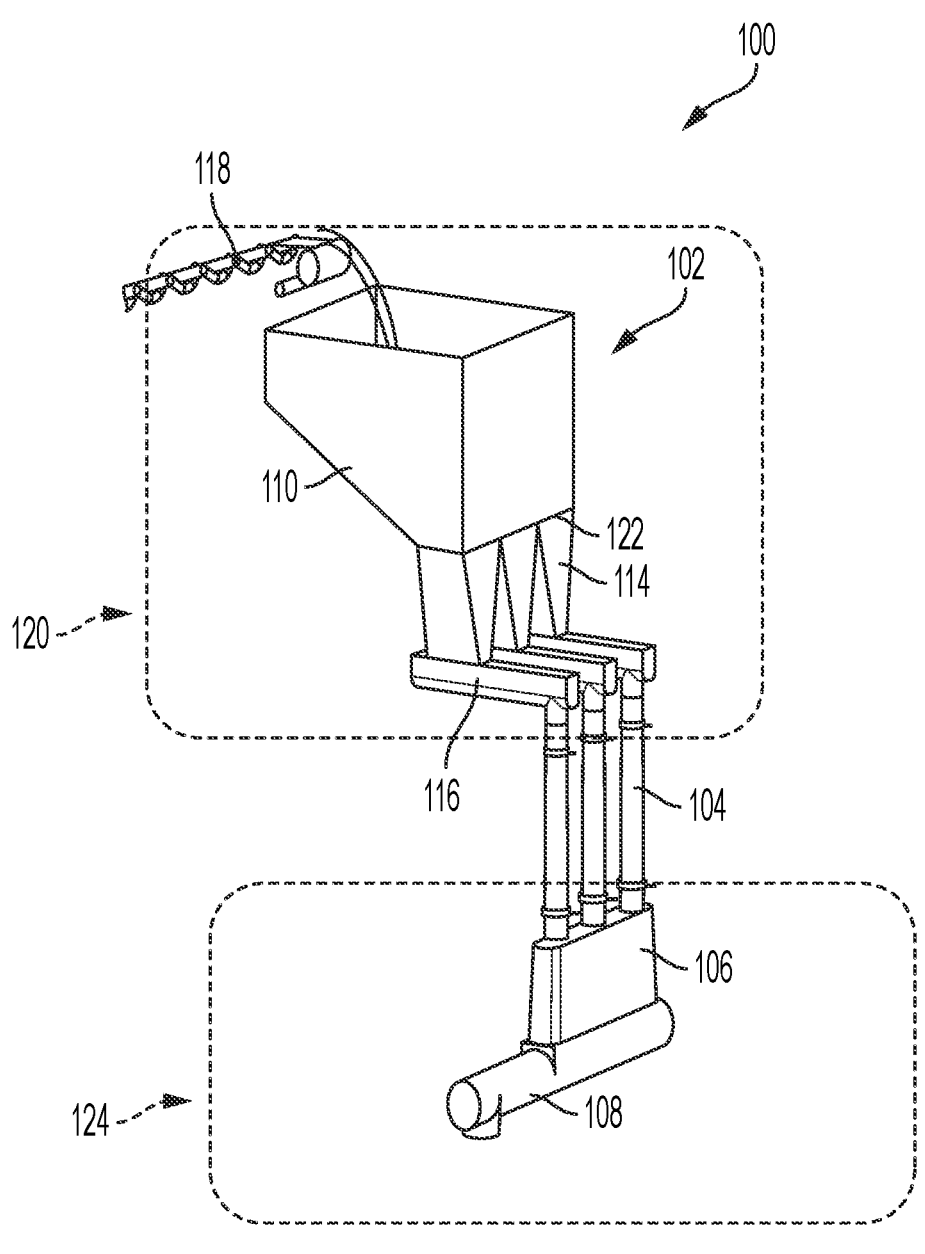
FIG. 6 depicts another example system for feeding bulk material into a pressurized environment in accordance with an embodiment of the present invention.

FIG. 6 shows an alternative embodiment of the system 100. It consists of a conventional belt conveyor 118 that conveys the bulk material/feedstock to the lock hopper filling system 102 of the overall system 100. This belt conveyor 118 is in a "low-pressure zone" 120. The belt conveyor 118 can be replaced with other types of conveyors such as a conventional screw conveyor or a conventional drag-chain conveyor, as would be appreciated by those of skill in the art. This conveyor 118 discharges bulk material into a surge bin 110. In this example embodiment, the specially designed surge bin 110 has a specially designed material propagation mechanism 112 comprising a distribu-tor screw in it. This distributor screw 112 spreads the bulk material/feedstock along its axis. The surge bin 110 has a linear array of openings 122 at its bottom. Each opening connects to a specially designed converging-diverging hop-per 114. Each converging-diverging hopper 114 has a spe-cially designed feeder 116 underneath, which discharges material into a specially designed lock hopper 104. All the lock hoppers 104 discharge into a common, specially designed feed bin 106, which is in a "high-pressure zone" 124. The feed bin 106 has a specially designed feeder 108 at its bottom, which can consist of one or more screw augers. The feeder 108 discharges material into the inlet opening of the pressurized vessel/reactor/environment.

Figure 7:
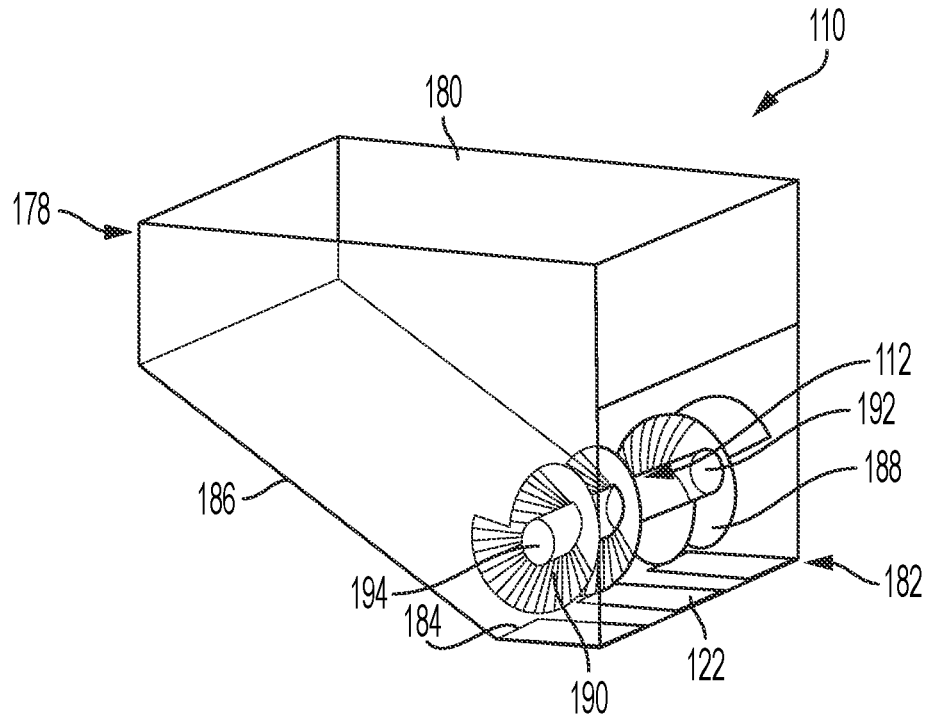
FIG. 7 depicts an example surge bin for use with the system of FIG. 6 in accordance with an embodiment of the present invention.
Figure 8:
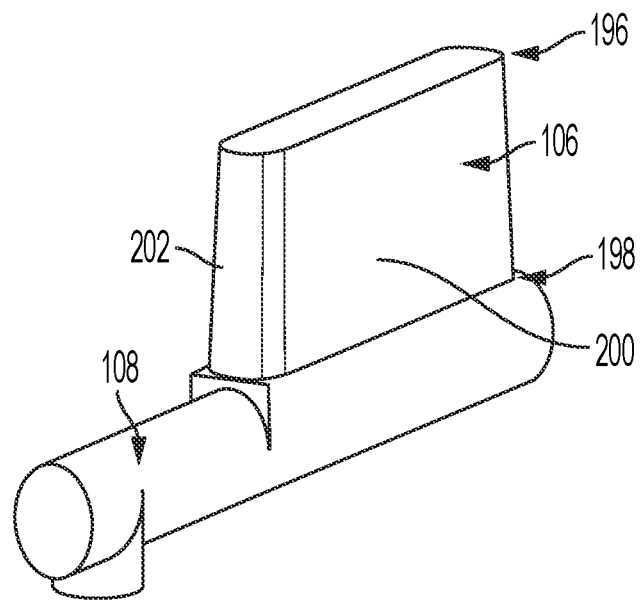
FIG. 8 depicts a feed bin and feeder for use with the system of FIG. 6 in accordance with embodiments of the present invention.

An example of a surge bin 110 used in the system 100 of FIG. 6 is shown in FIG. 7. The surge bin 110 is specially designed to receive material discharged by the conveyor on a sloping surface 186. In this example, the surge bin 110 comprises a top end 178 having an opening 180 for receiving a bulk material, a bottom end 182 having an outlet 184 for dispensing the bulk material in fluid communication with one of the one or more converging-diverging hoppers 114, and a sloping surface 186 extending from proximal the top end 178 (such as slightly below) to the bottom end 182. The sloping surface 186 acts as a chute where the angle of the sloping surface 186 is steeper than the critical chute angle of the bulk material, which causes the bulk material to flow to the material propagation mechanism 112 disposed in the surge bin 110 due to gravitational force on the bulk material. That is, when a bulk material is moving downward along a given sloping chute surface 186, the chute surface 186 must be sufficiently smooth and steep. Otherwise, due to friction between the bulk material and the surface 186, the bulk material will slow down as it moves along the chute surface 186 and can come to a stop. Such stopped material on the chute surface 186 will provide obstruction to the flow of the upstream material and can lead to plugging in the surge bin 110. Furthermore, the chute surface 186 also needs to be sufficiently smooth and steep to restart flow/sliding of bulk material that has come to a stop on the chute surface 186. This is especially important when the bulk material experi-ences impact due to free fall onto the chute surface 186. The required steepness or angle of chute surface 186 with the horizontal to achieve reliable flow is dependent on the bulk material itself, the surface/finish of the chute surface 186, as well as the operating conditions such as moisture content and impact pressure. This minimum angle from horizontal required to ensure reliable flow of a given bulk material, over a given chute surface 186, under the given operating conditions is called the critical chute angle. Those skilled in the art are able to determine the critical chute angle for the specific handling conditions.

In this example embodiment, the material propagation mechanism 112 comprises a distributor screw comprising right-handed flights 188 on the first half of its length and left-handed flights 190 on the second half of its length, such that the distributor screw distributes the bulk material from the center toward both a first end 192 and a second end 194 opposite the first end 192 of the propagation mechanism 112. Here, the surge bin 110 has a rectangular outlet 184, which has a linear array of several outlet openings evenly distrib-uted, each outlet opening 122 being in fluid communication with one of the one or more converging-diverging hoppers 114.

The embodiment of FIG. 6 makes use of the same converging-diverging hopper 114, screw feeder 116, and lock hopper 104 as the embodiment of FIG. 1, and further described in relation to FIGS. 3-4.

In the example embodiment of FIG. 6, the belt conveyor 118, surge bin 110, converging-diverging hopper 114, and screw feeder 116 below the converging-diverging hopper 114 are in a low-pressure zone 120. The lock hoppers 104 switch between low pressure 120 and high pressure 124, depending on their state of pressurization.

Once the material is discharged from a lock hopper 104, it drops into a specially designed feed bin 106 in fluid communication with the bottom outlet 166 of the lock hopper 104. An example of the feed bin 106 used in the embodiment of FIG. 6 can be seen in FIG. 8. Here the feed bin 106 has a rounded (such as obround or the like) or rectangular cross-section at the top 196 as well as at the bottom 198. It has diverging side walls 200 as well as diverging end walls 202 to avoid packing of pressure-sensitive bulk materials during discharge.

Below the feed bin 106, there is a specially designed feeder 108. It can consist of one or more screws 154. These screws 154 are specially designed, as described above in regard to FIG. 4, to achieve increased capacity in the direction of feed. As such, this feeder 108 is referred to as mass-flow screw feeder 108. If the magnitude of pressure in the high-pressure zone 124 is high enough, the geometry of the feed bin 106 and feeder 108 can be configured to use as much curved enclosure geometry as practically possible in place of the flat sections of the feed bin 106 and feeder 108.

The mass-flow screw feeder 108 can discharge bulk material directly into the inlet opening of a pressurized vessel or reactor, or it can discharge it into a conventional conveyor 126, such as a screw conveyor. In the latter case, the conveyor 126 then discharges the bulk material into the inlet opening of a pressurized vessel or reactor.

Figure 9:
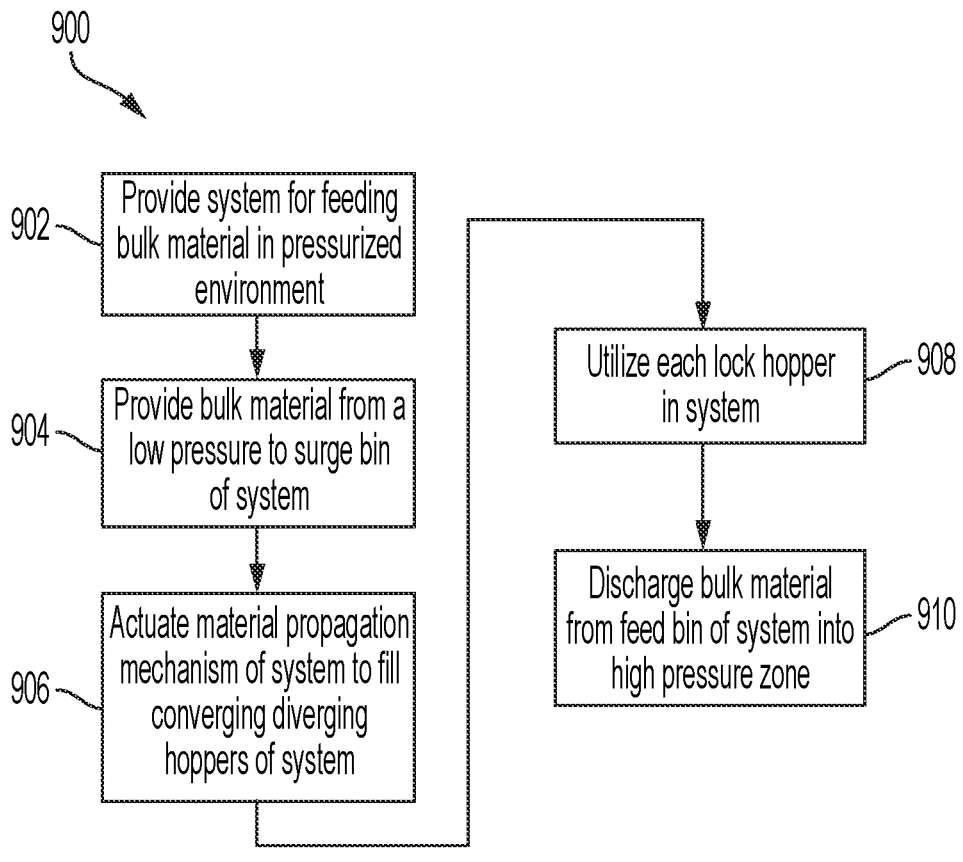
FIG. 9 is a flow diagram of a methodology for transferring bulk materials from a low-pressure zone to a high-pressure zone in accordance with embodiments of the present invention.

FIG. 9 depicts a flow diagram for a method 900 for transferring bulk materials from a low-pressure zone 120 to a high-pressure zone 124. The method 900 starts with providing a system 100 for feeding bulk material into a pressurized environment as disclosed herein (Step 902). Bulk material is then provided to the surge bin 110 of the system 100 in a low-pressure zone 120 (Step 904) continu-ously or intermittently such that the material level in the surge bin is maintained above a certain minimum level. The material propagation mechanism 112 of the surge bin is then actuated continuously or intermittently to fill the converg-ing-diverging hoppers 114 of the system 100 (Step 906). Each lock hopper 104 is then utilized to transfer the bulk material from the low-pressure zone 120 to the high-pres-sure zone 124 (Step 908). Finally, the bulk material is continuously discharged from the feed bin 106, which is at high pressure, into an inlet of a vessel, reactor, or environment in the high-pressure zone 124 by the feeder 108 (Step 910).

In some example embodiments, conveyor 126, such as a screw conveyor 126, is provided between the feeder 108 and the inlet of the vessel, reactor, or environment in the high-pressure zone 124.

Figure 10:
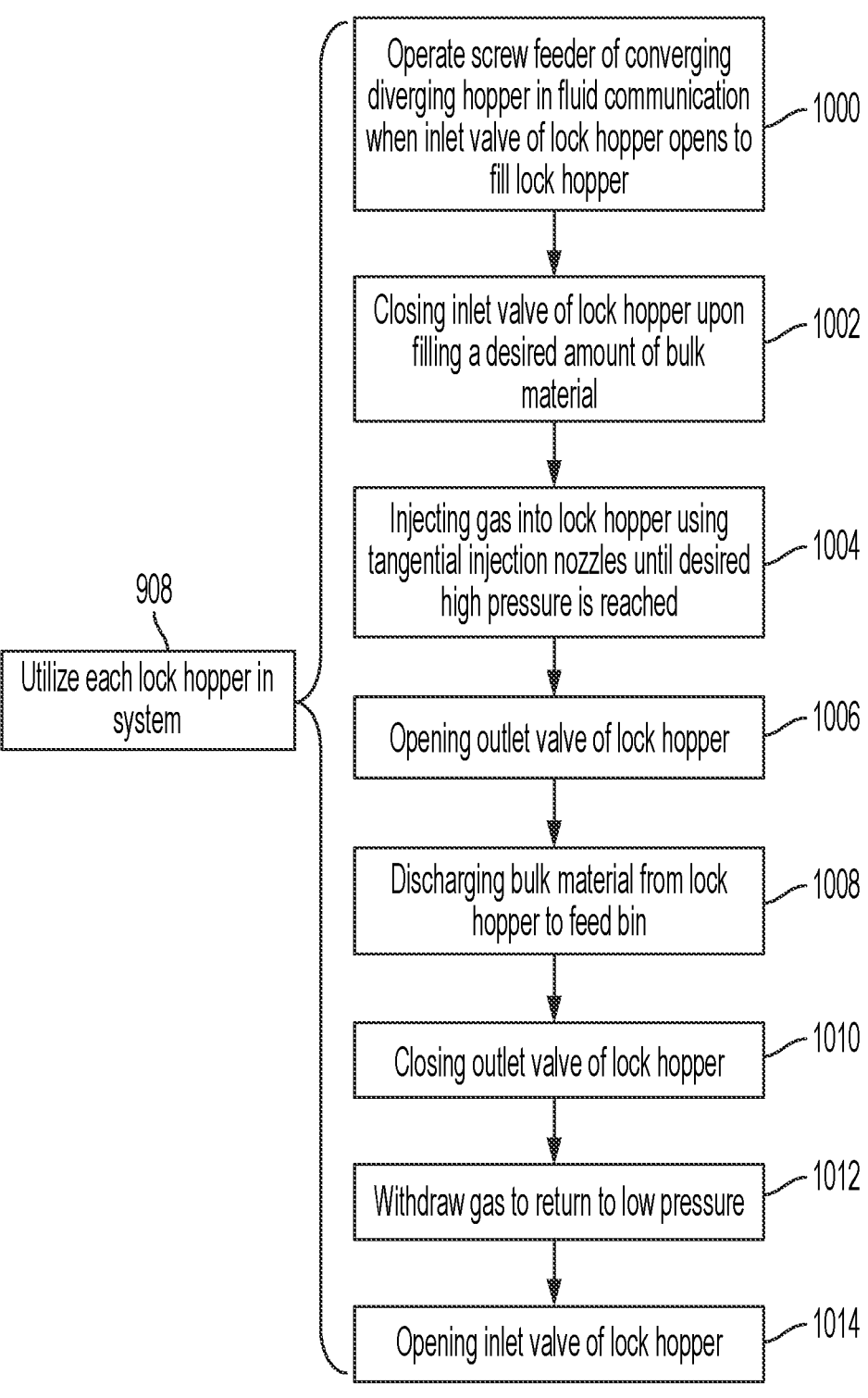
FIG. 10 is a high-volume flow diagram of the methodology for utilizing each lock hopper as set forth in FIG. 9 in accordance with embodiments of the present invention.

FIG. 10 depicts the steps performed during the utilization of each lock hopper 104 (step 908). For each lock hopper 104, the process starts with the screw feeder of the converging-diverging hopper 114 in fluid communication with the locker hopper 104 is operated to move material from the hopper 114 into an inlet valve 170 of a lock hopper 104, when the inlet valve 170 of the lock hopper 104 in communication with a converging-diverging hopper 114 opens to fill the lock hopper 104 with a desired amount of bulk material (Step 1000). The screw feeder is then stopped and inlet valve 170 of the lock hopper 104 is then closed upon filling a desired quantity of material (step 1002). A gas is then injected into the lock hopper 104 using the three or more tangential injection nozzles 174 until desired high pressure is reached in the lock hopper 104 (Step 1004). Once the lock hopper 104 is pressurized, the outlet valve 172 of the lock hopper 104 is then opened (step 1006). The bulk material is then discharged from the lock hopper 104 into the feed bin 106 (step 1008), the outlet valve 172 is closed (step 1010) gas is vented or withdrawn using the gas injection nozzles 174 until the desired low-pressure is reached (Step 1012), and the inlet valve 170 is opened (Step 1014).

In certain embodiments, recirculation of gas is maintained between the feed bin 106 and the lock hoppers 104 or just between the lock hoppers 104.

There is a strong growing interest in the industry to handle very large volumes of low-bulk density feedstocks. Such applications are best served by the use of multiple lock-hoppers for pressurization. Additionally, insufficient consideration has been given in conventional systems about how to physically arrange these multiple lock hoppers such that implementation of multiple-lock-hoppers feeding one pressurized vessel can be done in a practical manner. Furthermore, conventional lock hopper designs, which typically consist of converging section(s) are not best suited to handle low bulk density feedstocks, many of which are sensitive to pressurization or packing. How to design a lock hopper that is specially suited for pressurization of such low-bulk density and pressure sensitive materials has not been solved before now.

The present invention addresses all of the above shortcomings in conventional system configurations. In addition, because of the use of multiple lock hoppers, flexibility is achieved with respect to the pressurization cycle time. Furthermore, such a system helps with the scale-up of the process, where initially the design can include just one lock hopper, and then the system can be scaled up very easily, because of the use of an array of lock hoppers.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near-complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A lock hopper filling system, comprising:
   a surge bin for receiving bulk material, the surge bin comprising:
      a top end having an opening for receiving the bulk material;
      a bottom end having one or more circumferential opening for discharging/emitting the bulk material, each circumferential opening of the one or more circumferential opening being in fluid communication with one of the one or more converging-diverging hoppers; and
      at least one diverging wall extending from the top end to the bottom end;
   a material propagation mechanism disposed in the surge bin comprising an agitator configured to push the bulk material from a center of the surge bin toward the one or more circumferential openings, the agitator comprising:
      a bar vertically extending from the bottom end of the surge bin toward the top end of the surge bin;

a first set of horizontal arms extending from the bar in proximity to the bottom end of the surge bin, the first set of horizontal arms comprising two or more horizontal arms symmetrically placed about the bar, wherein each arm is configured to push the bulk material from the center of the surge bin toward the one or more circumferential openings; and a second set of horizontal arms extending from the bar in proximity to a mid-height of the surge bin comprising two or more horizontal arms symmetrically placed about the bar;

one or more converging-diverging hoppers in fluid communication with the surge bin; and one or more screw feeders, each screw feeder disposed at an outlet of each converging-diverging hopper and configured to move bulk material from the hopper into an inlet valve of a lock hopper.

2. The system of claim 1, wherein each arm has two or more flat plates that are progressively recessing from the center of the surge bin toward its circumference, in a direction of rotation of the agitator.

3. The system of claim 1, wherein the one or more circumferential opening comprises a circumferential array of rectangular or rounded outlet openings, evenly distributed.

4. The system of claim 1, wherein each of the one or more converging-diverging hoppers comprises:

a set of converging side walls disposed opposite each other; and a set of diverging end walls disposed opposite each other at ends of the converging side walls, wherein the sets of converging side walls and diverging end walls form an inlet at a top end of the converging-diverging hopper configured for receiving bulk material and an outlet at a bottom end of the converging-diverging hopper configured for dispensing bulk material; and where the side walls form angles relative to vertical that are smaller than a critical mass-flow angle of the bulk material.

5. The system of claim 1, wherein the one or more screw feeders are configured to achieve increasing capacity in a direction of feed.

6. The system of claim 5, wherein the one or more screw feeders comprise a screw configuration having a combination of tapering shaft and increasing pitch between screw flights, to allow for increase in a pitch volume from a start of the screw to at least a length Lf of a feed section of the screw or to an end of the screw.

7. The system of claim 5, wherein the one or more screw feeders comprise:

a shaft comprising a plurality of coaxial and contiguous cylindrical sections having progressively decreasing diameters and extending along a length L in a feed direction; and a screw blade formed in a helix coaxial with the shaft and having surfaces radially extending from the surface of each section of the shaft to an edge of constant diameter D over the length L, a volume capacity of each section being proportional to a difference between $D^2$ and a square of the cylindrical section diameter, and wherein differences in volume capacity between each pair of contiguous sections are equal at least over a length Lf of a feed section of the screw or over length L.

8. The system of claim 1, further comprising a conveyor belt configured to convey the bulk material to the surge bin.

9. A lock hopper comprising:

a housing having a top inlet, a bottom outlet, and internal volume defined by diverging walls that are diverging toward the bottom outlet;

a gas pressure sealing valve at the top inlet;

a gas pressure sealing valve at the bottom outlet; and at least three gas injection nozzles arranged to be equidistant from each other and configured to inject or withdraw gas into the lock hopper in a tangential manner.

10. The lock hopper of claim 9, wherein by injecting gas in a tangential manner, the lock hopper minimizes a gas pressure gradient during pressurization, which minimizes consolidation and/or packing and arching potential of bulk materials in the lock hopper.

11. A system for feeding bulk material into a pressurized environment, the system comprising:

a lock hopper filling system comprising:

a surge bin for receiving bulk material;

a material propagation mechanism disposed in the surge bin;

one or more converging-diverging hoppers in fluid communication with the surge bin; and one or more screw feeders, each screw feeder disposed at an outlet of each converging-diverging hopper and configured to move material from the hopper into an inlet valve of a lock hopper;

one or more lock hoppers each in fluid communication with one of the one or more screw feeders, each lock hopper comprising:

a housing having a top inlet, a bottom outlet, and internal volume defined by diverging walls that are diverging toward the bottom outlet;

a gas pressure sealing valve at the top inlet;

a gas pressure sealing valve at the bottom outlet; and at least three gas injection nozzles arranged to be equidistant from each other and configured to inject or withdraw gas into the lock hopper in a tangential manner;

a feed bin in fluid communication with the bottom outlet of each of the one or more lock hoppers, the feed bin having diverging walls; and a feeder comprising one or more screws configured to continuously discharge bulk material from the feed bin into an inlet opening of the pressurized environment.

12. The system of claim 11, wherein the surge bin comprises:

a top end having an opening for receiving a bulk material;

a bottom end having at one or more circumferential opening for discharging/emitting a bulk material, each circumferential opening of the one or more circumferential opening being in fluid communication with one of the one or more converging-diverging hoppers; and at least one diverging wall extending from the top end to the bottom end.

13. The system of claim 12, wherein the material propagation mechanism comprises an agitator configured to push bulk material from a center of surge bin toward the one or more circumferential openings.

14. The system of claim 13, wherein the agitator comprises:

a bar vertically extending from a bottom end of the surge bin toward a top end of the surge bin;

a first set of horizontal arms extending from the bar in proximity to the bottom end of the surge bin, the first set of horizontal arms comprising two or more horizontal arms symmetrically placed about the bar, wherein each arm is configured to push bulk material from the center of surge bin toward the one or more circumferential openings; and a second set of horizontal arms extending from the bar in proximity to a mid-height of the surge bin comprising two or more horizontal arms symmetrically placed about the bar.

15. The system of claim 14, wherein each arm has two or more flat plates that are progressively recessing from a center of the surge bin toward its circumference, in a direction of rotation of the agitator.

16. The system of claim 12, wherein the one or more circumferential opening comprises a circumferential array of rectangular or rounded outlet openings, evenly distributed.

17. The system of claim 11, wherein the surge bin comprises:

a top end having an opening for receiving a bulk material;

a bottom end having an outlet for dispensing a bulk material in fluid communication with one of the one or more converging-diverging hoppers; and a sloping surface extending from proximal the top end to the bottom end;

wherein the sloping surface acts as a chute where an angle of the sloping surface is steeper than a critical chute angle of the bulk material, and which causes the bulk material to flow to the material propagation mechanism disposed in the surge bin due to gravitational force on the bulk material.

18. The system of claim 17, wherein the material propagation mechanism comprises a distributor screw comprising right-handed flights on a first half of its length and left-handed flights on a second half of its length, such that the distributor screw distributes the bulk material from a center toward both a first end and a second end opposite the first end of the propagation mechanism.

19. The system of claim 17, wherein the surge bin has a rectangular outlet, which has a linear array of several outlet openings evenly distributed, each outlet opening being in fluid communication with one of the one or more converging-diverging hoppers.

20. The system of claim 11, wherein each of the one or more converging-diverging hoppers comprises:

a set of converging side walls disposed opposite each other; and a set of diverging end walls disposed opposite each other at ends of the converging side walls, wherein the sets of converging side walls and diverging end walls form an inlet at a top end of the converging-diverging hopper configured for receiving bulk material and an outlet at a bottom end of the converging-diverging hopper configured for dispensing bulk material; and where the side walls form angles relative to vertical that are smaller than a critical mass-flow angle of the bulk material.

21. The system of claim 11, wherein the one or more screw feeders are configured to achieve increasing capacity in a direction of feed.

22. The system of claim 21, wherein the one or more screw feeders comprise a screw configuration having a combination of tapering shaft and increasing pitch between screw flights, to allow for increase in a pitch volume, from a start of the screw to at least an end of a feed section Lf of the screw or to an end of the screw.

23. The system of claim 21, wherein the screw feeder comprises:

a shaft comprising a plurality of coaxial and contiguous cylindrical sections having progressively decreasing diameters and extending along a length L in a feed direction; and a screw blade formed in a helix coaxial shape with the shaft and having surfaces radially extending from the surface of each section of the shaft to an edge of constant diameter D over the length L, a volume capacity of each section being proportional to a difference between $D^2$ and a square of the cylindrical section diameter, and differences in volume capacity between each pair of contiguous sections being equal at least over a length Lf of the feed section or over the length L.

24. The system of claim 11, further comprising a conveyor belt for conveying the bulk material to the surge bin.

25. The system of claim 11, wherein the feeder is configured to achieve increasing capacity in a direction of feed.

26. The system of claim 11, wherein each of the one or more screws of the feeder comprises a screw configuration having a combination of tapering shaft and increasing pitch between screw flights, to allow for increase in a pitch volume, from a start of the screw to at least a length an end of the screw.

27. The system of claim 11, wherein each of the one or more screws of the feeder comprises:

a shaft comprising a plurality of coaxial and contiguous cylindrical sections having progressively decreasing diameters and extending along a length L in a feed direction; and a screw blade formed in a helix coaxial with the shaft and having surfaces radially extending from the surface of each section of the shaft to an edge of constant diameter D over the length L, volume capacity of each section being proportional to a difference between $D^2$ and a square of the cylindrical section diameter, and differences in volume capacity between each pair of contiguous sections being equal over the length L.

28. The system of claim 11, further comprising a conveyor disposed between the feeder and the inlet opening of the pressurized environment, wherein the conveyor is oriented perpendicular to an outlet of the feeder and discharges bulk material into the inlet opening of the pressurized environment.

29. The system of claim 28, wherein the conveyor comprises a screw conveyor.

30. A method for transferring bulk materials from a low-pressure zone to a high-pressure zone, the method comprising:

providing a system for feeding bulk material into a pressurized environment, the system comprising:

a lock hopper filling system comprising:

a surge bin for receiving bulk material;

a material propagation mechanism disposed in the surge bin;

one or more converging-diverging hoppers in fluid communication with the surge bin; and one or more screw feeders, each screw feeder disposed at an outlet of each converging-diverging hopper and configured to move material from the hopper into an inlet valve of a lock hopper;

one or more lock hoppers each in fluid communication with one of the one or more screw feeders, each lock hopper comprising:

a housing having a top inlet, a bottom outlet, and internal volume defined by diverging walls that are diverging toward the bottom outlet;

a gas pressure sealing valve at the top inlet;

a gas pressure sealing valve at the bottom outlet; and at least three gas injection nozzles arranged to be equidistant from each other and configured to inject or withdraw gas into the lock hopper in a tangential manner;

a feed bin in fluid communication with the bottom outlet of each of the one or more lock hoppers, the feed bin having diverging walls;

a feeder comprising one or more screws configured to continuously discharge bulk material from the feed bin into an inlet opening of the pressurized environment;

providing bulk material from a low pressure to the surge bin, continuously or intermittently, such that a material level in the surge bin is maintained above a certain minimum level;

actuating the material propagation mechanism continuously or intermittently to fill the converging-diverging hoppers;

for each lock hopper:

operating the screw feeder configured to move material from the converging-diverging hopper into an inlet valve of a lock hopper, when the inlet valve of the lock hopper in communication with a converging-diverging hopper opens to fill the lock hopper with a desired amount of bulk material;

closing the inlet valve of the lock hopper upon filling a desired quantity of material;

injecting a gas into the lock hopper using the at least three tangential injection nozzles until desired high pressure is reached in the lock hopper;

opening the outlet valve of the lock hopper;

discharging the material from the lock hopper into the feed bin;

closing the outlet valve;

withdrawing gas from the lock hopper using the injection nozzles until a desired low-pressure is reached in the lock hopper; and opening the inlet valve;

continuously discharging the bulk material from the feed bin, which is at the high pressure, into the high pressure zone using the feeder.

31. The method of claim 30, wherein recirculation of gas is maintained between the feed bin and the lock hoppers or just between the lock hoppers.

32. The method of claim 30, wherein the surge bin comprises:

a top end having an opening for receiving a bulk material;

a bottom end having one or more circumferential opening for discharging/emitting a bulk material, each circumferential opening in fluid communication with one of the one or more converging-diverging hoppers; and at least one diverging wall extending from the top end to the bottom end.

33. The method of claim 32, wherein the material propagation mechanism comprises an agitator configured to push bulk material from a center of surge bin toward the one or more circumferential openings.

34. The method of claim 33, wherein the agitator comprises:

a bar vertically extending from the bottom end of the surge bin toward the top end of the surge bin;

a first set of horizontal arms extending from the bar in proximity to the bottom end of the surge bin, the first set of horizontal arms comprising two or more horizontal arms symmetrically placed about the bar, wherein each arm is configured to push bulk material from the center of surge bin toward the one or more circumferential openings; and a second set of horizontal arms extending from the bar in proximity to a mid-height of the surge bin comprising two or more horizontal arms symmetrically placed about the bar.

35. The method of claim 34, wherein each arm has two or more flat plates that are progressively recessing from the center of the surge bin toward its circumference, in a direction of rotation of the agitator.

36. The method of claim 32, wherein the one or more circumferential opening comprises a circumferential array of rectangular or rounded outlet openings, evenly distributed.

37. The method of claim 30, wherein the surge bin comprises:

a top end having an opening for receiving a bulk material;

a bottom end having an outlet for dispensing a bulk material in fluid communication with one of the one or more converging-diverging hoppers; and a sloping surface extending from proximal the top end to the bottom end;

wherein the sloping surface acts as a chute where an angle of the sloping surface is steeper than a critical chute angle of the bulk material, and which causes the bulk material to flow to the material propagation mechanism disposed in the surge bin due to gravitational force on the bulk material.

38. The method of claim 37, wherein the material propagation mechanism comprises a distributor screw comprising right-handed flights on a first half of its length and left-handed flights on a second half of its length, such that the distributor screw distributes the bulk material from a center toward both a first end and a second end opposite the first end of the propagation mechanism.

39. The method of claim 37, wherein the surge bin has a rectangular outlet, which has a linear array of several outlet openings evenly distributed, each outlet opening being in fluid communication with one of the one or more converging-diverging hoppers.

40. The method of claim 31, wherein each of the one or more converging-diverging hoppers comprises:

a set of converging side walls disposed opposite each other; and a set of diverging end walls disposed opposite each other at the ends of the converging side walls, wherein the sets of converging side walls and diverging end walls form an inlet at a top end of the converging-diverging hopper configured for receiving bulk material and an outlet at a bottom end of the converging-diverging hopper configured for dispensing bulk material; and where the side walls form angles relative to vertical that are smaller than a critical mass-flow angle of the bulk material.

41. The method of claim 31, wherein the screw feeder is configured to achieve increasing capacity in a direction of feed.

42. The method of claim 41, wherein the screw feeder comprises a screw configuration having a combination of tapering shaft and increasing pitch between screw flights, to allow for increase in a pitch volume, from a start of the screw to at least a length Lf of a feed section of the screw or to an end of the screw.

43. The method of claim 41, wherein the screw feeder comprises:

a shaft comprising a plurality of coaxial and contiguous cylindrical sections having progressively decreasing diameters and extending along a length L in a feed direction; and a screw blade formed in a helix coaxial with the shaft and having surfaces radially extending from the surface of each section of the shaft to an edge of constant diameter D over the length L, a volume capacity of each section being proportional to a difference between $D^2$ and a square of the cylindrical section diameter, and differences in volume capacity between each pair of contiguous sections being equal at least over a length Lf of the feed section of the screw or over the length L.

44. The method of claim 31, further comprising a conveyor belt for conveying the bulk material to the surge bin.

45. The method of claim 31, wherein the feeder is configured to achieve increasing capacity in a direction of feed.

46. The method of claim 31, wherein each of one or more screws of the feeder comprises a screw configuration having a combination of tapering shaft and increasing pitch between screw flights, to allow for increase in a pitch volume, from a start of the screw to at least a length Lf of a feed section of the screw or to an end of the screw.

47. The method of claim 31, wherein each of the one or more screws of the feeder comprises:

a shaft comprising a plurality of coaxial and contiguous cylindrical sections having progressively decreasing diameters and extending along a length L in a feed direction; and a screw blade formed in a helix coaxial with the shaft and having surfaces radially extending from a surface of each section of the shaft to an edge of constant diameter D over the length L, a volume capacity of each section being proportional to a difference between $D^2$ and a square of the cylindrical section diameter, and wherein differences in volume capacity between each pair of contiguous sections being equal at least over a length Lf of a feed section of the screw or over length L.

48. The method of claim 31, further comprising a conveyor disposed between the feeder and the inlet opening of a pressurized zone, wherein conveyor is oriented perpendicular to an outlet of the feeder and discharges bulk material into the inlet opening of the pressurized zone.

49. The method of claim 48, wherein the conveyor comprises a screw conveyor.

50. A lock hopper filling system comprising:

a surge bin for receiving bulk material, the surge bin comprising:

a top end having an opening for receiving a bulk material;

a bottom end having an outlet for dispensing a bulk material in fluid communication with one of the one or more converging-diverging hoppers; and a sloping surface extending from proximal the top end to the bottom end;

wherein the sloping surface acts as a chute where an angle of the sloping surface is steeper than a critical chute angle of the bulk material, and which causes the bulk material to flow to the material propagation mechanism disposed in the surge bin due to gravitational force on the bulk material;

a material propagation mechanism disposed in the surge bin, the material propagation mechanism comprising a distributor screw comprising right-handed flights on a first half of its length and left-handed flights on a second half of its length, such that the distributor screw distributes the bulk material from a center toward both a first end and a second end opposite the first end of the propagation mechanism;

one or more converging-diverging hoppers in fluid communication with the surge bin; and one or more screw feeders, each screw feeder disposed at an outlet of each converging-diverging hopper and configured to move material from the hopper into an inlet valve of a lock hopper.

51. The system of claim 50, wherein each of the one or more converging-diverging hoppers comprises:

a set of converging side walls disposed opposite each other; and a set of diverging end walls disposed opposite each other at ends of the converging side walls, wherein the sets of converging side walls and diverging end walls form an inlet at a top end of the converging-diverging hopper configured for receiving bulk material and an outlet at a bottom end of the converging-diverging hopper configured for dispensing bulk material; and where the side walls form angles relative to vertical that are smaller than a critical mass-flow angle of the bulk material.

52. The system of claim 50, wherein the one or more screw feeders are configured to achieve increasing capacity in a direction of feed.

53. The system of claim 52, wherein the one or more screw feeders comprise a screw configuration having a combination of tapering shaft and increasing pitch between screw flights, to allow for increase in a pitch volume from a start of the screw to at least a length Lf of a feed section of the screw or to an end of the screw.

54. The system of claim 52, wherein the one or more screw feeders comprise:

a shaft comprising a plurality of coaxial and contiguous cylindrical sections having progressively decreasing diameters and extending along a length L in a feed direction; and a screw blade formed in a helix coaxial with the shaft and having surfaces radially extending from the surface of each section of the shaft to an edge of constant diameter D over the length L, a volume capacity of each section being proportional to a difference between $D^2$ and a square of the cylindrical section diameter, and wherein differences in volume capacity between each pair of contiguous sections are equal at least over a length Lf of a feed section of the screw or over length L.

55. The system of claim 50, further comprising a conveyor belt configured to convey the bulk material to the surge bin.

56. A lock hopper filling system comprising:

a surge bin for receiving bulk material, the surge bin comprising:

a top end having an opening for receiving a bulk material;

a bottom end having an outlet for dispensing a bulk material in fluid communication with one of the one or more converging-diverging hoppers; and a sloping surface extending from proximal the top end to the bottom end;

wherein the sloping surface acts as a chute where an angle of the sloping surface is steeper than a critical chute angle of the bulk material, and which causes the bulk material to flow to the material propagation mechanism disposed in the surge bin due to gravitational force on the bulk material;

a material propagation mechanism disposed in the surge bin;

one or more converging-diverging hoppers in fluid communication with the surge bin; and one or more screw feeders, each screw feeder disposed at an outlet of each converging-diverging hopper and configured to move material from the hopper into an inlet valve of a lock hopper;

wherein the surge bin has a rectangular outlet, which has a linear array of several outlet openings evenly distributed, each outlet opening being in fluid communication with one of the one or more converging-diverging hoppers.

57. The system of claim 56, wherein each of the one or more converging-diverging hoppers comprises:

a set of converging side walls disposed opposite each other; and a set of diverging end walls disposed opposite each other at ends of the converging side walls, wherein the sets of converging side walls and diverging end walls form an inlet at a top end of the converging-diverging hopper configured for receiving bulk material and an outlet at a bottom end of the converging-diverging hopper configured for dispensing bulk material; and where the side walls form angles relative to vertical that are smaller than a critical mass-flow angle of the bulk material.

58. The system of claim 56, wherein the one or more screw feeders are configured to achieve increasing capacity in a direction of feed.

59. The system of claim 58, wherein the one or more screw feeders comprise a screw configuration having a combination of tapering shaft and increasing pitch between screw flights, to allow for increase in a pitch volume from a start of the screw to at least a length Lf of a feed section of the screw or to an end of the screw.

60. The system of claim 58, wherein the one or more screw feeders comprise:

a shaft comprising a plurality of coaxial and contiguous cylindrical sections having progressively decreasing diameters and extending along a length L in a feed direction; and a screw blade formed in a helix coaxial with the shaft and having surfaces radially extending from the surface of each section of the shaft to an edge of constant diameter D over the length L, a volume capacity of each section being proportional to a difference between $D^2$ and a square of the cylindrical section diameter, and wherein differences in volume capacity between each pair of contiguous sections are equal at least over a length Lf of a feed section of the screw or over length L.

61. The system of claim 56, further comprising a conveyor belt configured to convey the bulk material to the surge bin.

\* \* \* \* \*